United States Patent [19]

Henbest et al.

[11] 4,284,759
[45] Aug. 18, 1981

[54] PREPARATION OF AMINOPLAST RESIN PARTICLES

[75] Inventors: Richard G. C. Henbest; John Harrison, both of Norton, England

[73] Assignee: Imperial Chemical Industries Limited, London, England

[21] Appl. No.: 35,643

[22] Filed: May 3, 1979

[30] Foreign Application Priority Data

May 31, 1978 [GB] United Kingdom ............... 25658/78

[51] Int. Cl.$^3$ ............................................. C08G 12/12
[52] U.S. Cl. .................................... 528/261; 260/17.3; 260/37 NP; 260/39 P; 260/29.4 R; 525/509; 528/240; 528/242; 528/244; 528/259; 528/265; 528/502; 162/146; 162/166
[58] Field of Search ............... 528/244, 259, 265, 240, 528/242, 261; 260/17.3, 37 NP, 39 P; 162/166, 146; 525/502

[56] References Cited

U.S. PATENT DOCUMENTS

| | | | |
|---|---|---|---|
| 2,556,898 | 6/1951 | Brookes et al. | 260/29.4 R |
| 2,863,842 | 12/1958 | Bonzagni | 528/265 |
| 3,909,348 | 9/1975 | Economou et al. | 162/166 |
| 3,928,272 | 12/1975 | Brancato et al. | 162/166 |
| 3,941,734 | 3/1976 | Aignesberger et al. | 528/265 |
| 3,983,269 | 9/1976 | Pearson | 528/244 |
| 4,172,057 | 10/1979 | Henbest | 162/166 |

FOREIGN PATENT DOCUMENTS

| | | | |
|---|---|---|---|
| 509732 | 2/1955 | Canada | 528/265 |
| 2754525 | 6/1978 | Fed. Rep. of Germany . | |
| 2810299 | 9/1978 | Fed. Rep. of Germany . | |
| 595368 | 12/1947 | United Kingdom . | |
| 654305 | 6/1951 | United Kingdom | 528/265 |
| 738033 | 10/1955 | United Kingdom . | |
| 1043437 | 9/1966 | United Kingdom . | |
| 1318244 | 5/1973 | United Kingdom . | |

OTHER PUBLICATIONS

Chemical Abstracts, 83, 80292y (1975).

Primary Examiner—Harold D. Anderson
Attorney, Agent, or Firm—Cushman, Darby & Cushman

[57] ABSTRACT

Aminoplast resin pigments for paper making comprise large surface area ($>5m^2/g$) particles, preferably of size below 200 µm, made from an aminoplast resin made by condensing formaldehyde with urea and/or melamine in the presence of 0.2 to 15 moles, per 100 moles of formaldehyde, or sulphite, phosphate, phosphite or borate radicals. The resin may be converted to the particulate form by gelling the resin in extended form by dilution with an aqueous acid, followed by drying, curing, and comminution of the gelled resin. To effect gelation in extended form the resin is preferably diluted to a resin solids content of less than 25% by weight by the addition of sufficient acid to cause gelation within 20 minutes.

9 Claims, No Drawings

PREPARATION OF AMINOPLAST RESIN PARTICLES

Urea-formaldehyde resin pigments are known and are sold as additives for paper (see, for example, Paper Technology June 1974 p 164, Makromolekulare Chemie, 1971, 149 p 1-27, and U.K. Pat. Nos. 1239143, 1296246, 1318244 and 1451973).

These pigments are prepared by treating a UF resin with, for preference, sulphamic acid and a surfactant. The pigments confer a good colour and improved opacity to papers, and improved bulk. Such pigments do, however, decrease the strength of the paper and are not totally retained in the paper web during papermaking.

We have now produced an improved pigment for papermaking, which is substantive to cellulose pulp, is therefore easily retained with little, if any, loss of paper strength and which can be easily and efficiently prepared.

In our German OLS Specification No. 2754525 (which corresponds to U.K. Application No. 51199/76 and U.S. Ser. No. 857972) aminoplast resin, eg UF resin fibres having certain inorganic oxyacid radicals incorporated therein are described. These fibres are made by forming a concentrated aminoplast resin solution containing the inorganic oxyacid radicals and then converting the resin solution into fibres, eg by centrifugal spinning.

We have now found that improved pigments for paper making can be formed from aminoplast resins containing such inorganic oxyacid radicals. In order that the resin is suitable as a paper pigment it has to be converted to a particulate form having a high surface area, for example in excess of 5 $m^2/g$. This can be achieved by causing the resin to gel and polymerise in an "extended" form consisting of high-area particles lightly bonded together which can, after curing, be comminuted to a powder form.

Accordingly we provide particles of an aminoplast resin comprising a condensate of at least one amino compound selected from urea and melamine with formaldehyde containing 0.2 to 15 inorganic oxyacid radicals selected from sulphite, phosphate, phosphate, phosphite and borate radicals, per 100 methylene radicals in the resin, said particles having a surface area of at least 5 $m^2/g$.

The aminoplast resin is a condensate of urea and/or melamine with formaldehyde. The molar ratio of formaldehyde to amino groups is preferably in the range 0.6 to 1.2, particularly above 0.75. Where the aminoplast resin is a urea formaldehyde resin, which is to be preferred, this corresponds to a formaldehyde: urea molar ratio range of 1.2 to 2.4, particularly above 1.5.

The amino compound is generally initially condensed with formaldehyde in an aqueous medium, eg by the use of an aqueous solution of formaldehyde, ie formalin, under neutral or alkaline conditions. The inorganic oxyacid radicals are incorporated at this stage, either before or during this initial condensation. The inorganic oxyacid radicals may be incorporated by the addition of the appropriate acid or by addition of one or more salts that give rise to such radicals. Because of the need to avoid premature crosslinking, a pH above about 6 is normally maintained during the intial condensation. Where the inorganic oxyacid radicals are added as the acid, some alkali may also be required to maintain the necessary pH. The inorganic oxyacid radicals are thus preferably added as salts. Examples of suitable salts include sodium sulphite, sodium metabisulphite, sodium dihydrogen phosphate, sodium hydrogen phosphite and sodium tetraborate (borax). Mixtures of such salts may be used, for example sodium sulphite in admixture with sodium metabisulphite. In the case of sulphites, the radicals may be introduced by the incorporation of the reaction product of formaldehyde and sulphites, eg by addition of sodium formaldehyde bisulphite. The reduction product thereof, viz sodium formaldehyde sulphoxylate, is readily oxidised to give sulphite radicals and so may also be used as a source of sulphite radicals.

The amount of inorganic oxyacid radicals used is from 0.2 to 15, preferably 0.5 to 10, particularly 0.7 to 5, moles per 100 moles of formaldehyde. During the condensation and curing of the aminoplast resin water is produced and the amino compound becomes linked by methylene bridges derived from the formaldehyde. Consequently the presence of x mole % (based on formaldehyde) of inorganic oxyacid radicals during the condensation results in x inorganic oxyacid radicals per 100 methylene radicals in the aminoplast resin.

As mentioned hereinbefore, in order to obtain the resin in a particulate form having a high surface area, the resin may be gelled and polymerised in an extended form. Formaldehyde resins are normally gelled, eg in fibre production as described in aforesaid OLS Specification No. 2754525, by adding to a concentrated resin solution, eg having a viscosity of 5-100 poise, a small amount of a curing catalyst, eg 5 ml of a 5% aqueous phosphoric acid solution per 100 ml of the concentrated resin solution. Such a concentrated resin solution may typically have a solids content of 55-70% by weight.

In contrast thereto, in order to obtain gelation in the extended form, sufficient catalyst solution, optionally together with additional water, is added to dilute the resin considerably, eg to a solids content below 25% by weight. Also the amount of catalyst, which is a strong acid such as sulphuric, hydrochloric, or phosphoric acid, must be sufficient to ensure rapid gelation. In particular sufficient acid should be added to ensure that the resin gels within 20 minutes of the time of acid addition. The maximum time permissible for gelation will depend on the extent of the condensation at the time of acid addition. Thus, during storage, condensation tends to continue slowly, with an observable increase in viscosity. Also in some resins the initial condensation may have been continued to a greater extent than in other resins. As a general guide, the amount of acid that is added should be sufficient to ensure gelation within 10 minutes of acid addition if the resin has been condensed, at the time of acid addition, to an extent equivalent to that of a resin of the same composition which, at a solids content of 66% by weight, has a viscosity of more than 50 poise. Where the resin has been condensed to a lesser extent, is equivalent to that of a resin having a viscosity of less than 50 poise at 66% by weight solids, the amount of acid added should be sufficient to ensure gelation within 20 minutes.

It will be appreciated that simple experimentation will indicate how much acid is necessary to obtain gelation in the extended form. The amount of acid required will generally be within the range 5 to 20% by weight (expressed as 100% acid), based on the weight of the resin solids.

The aminoplast resin produced by condensing the amino compound and formaldehyde will normally have a solids content in the range 30 to 50% by weight. Normally the resin is concentrated to a solids content within the range 55 to 70% by weight, generally to above 60% by weight. Omission of such a concentration step presents storage problems owing to separation, on standing, of crystalline methylolated derivatives of the amino compound. Such crystalline derivatives tend to be difficult to resolvate. However where the resin is used directly to produce the pigment powder, with no intermediate storage, such a concentration step is not essential. Thus in order to ensure gelation in the extended form the resin is diluted, either with or without an intermediate concentration step, to a solids content below about 25%, particularly to below 22%, by weight. Insufficient dilution tends to increase the density of the gelled resin mass making the latter harder to comminute into high area particles. Also insufficient dilution tends to reduce the surface area of the resultant particles. If any given resin is diluted by more than a certain extent, generally corresponding to a solids content below about 10% by weight, precipitation of portions of the resin rapidly occurs. It is therefore preferred to dilute the resin to a solids content between 13 and 22% by weight. The dilution is preferably performed in stages by first diluting with water and then adding the appropriate amount of an aqueous solution of the acid to give the requisite concentration of acid catalyst and the requisite degree of dilution.

Under these conditions, the resin system gels and polymerises in an extended form consisting of high-area particles lightly bonded together. During the gelation stage little, if any, aqueous material is expelled from the system; this is unlike the normal gelation of aminoplast resins, where considerable syneresis can take place. The low density gelled mass (which may be in the form of a cast block) has then to be cured and disintegrated to form the pigment particles. Conveniently the cast block is first broken up into small pieces and dried, for example in an air oven at 50° C. The dried gelled resin is then cured, typically by heating in an oven for 15 minutes to 4 hours at temperatures within the range 100° to 200° C. Preferred curing conditions are 30 minutes to 2 hours at 110° to 140° C. The cured resin mass typically has a density within the range 0.1 to 0.3 g/cm$^3$. The cured resin is then comminuted to produce the pigment particles. The comminution, preferably by grinding or milling, is preferably conducted to produce particles having a size below 200 $\mu$m, particularly below 100 $\mu$m. The particles however preferably have a particle size above 5 $\mu$m. The final grinding or milling may be done, advantageously, in water to produce a slurry suitable for addition to paper furnishes.

The pigment particles may be used in paper made from mechanical and/or chemical cellulosic pulps but are of particular utility in papers based on chemical pulps, eg kraft or birch sulphate. The cellulose pulp may be used alone or in conjunction with synthetic fibrous materials such as polyolefin fibres and urea-formaldehyde fibres (for example as described in our German OLS Specification No. 2810299—corresponding to U.S. Ser. No. 883667 and U.K. Application No. 10404/77). Paper compositions preferably contain 1 to 25, particularly 2 to 15% by weight of the pigment particles.

The pigment powders according to the invention are, particularly when used in conjunction with multivalent ions such as $Al^{3+}$, $Ti^{4+}$, $Fe^{3+}$, and $Zr^{4+}$, readily retained on paper webs and improve opacify, colour, and in some instances the bulk.

The particles are substantive to cellulose and to other particulate matter in the paper furnish and so assist in the retention of other, for example inorganic, pigments and fillers. The strength of the paper web is less diminished than with UF pigment particles unmodified by the inorganic oxyacid radicals, and in some cases may be increased.

In the following examples all parts and percentages are expressed by weight.

EXAMPLE 1

Preparation of the modified resin 3560 parts of formalin (containing 36.6% formaldehyde and 5.7% methanol) was mixed with 1303 parts of urea, to give a formaldehyde: urea molar ratio of 2:1, and warmed to 50° C. to effect dissolution. To this 5 parts of sodium sulphite $Na_2SO_3$ and 186 parts of sodium metabisulphite $Na_2S_2O_5$ were added, the pH adjusted to 9 and the mixture refluxed for 30 minutes. The pH was then reduced to 4.85 and the mixture refluxed for 45 minutes. The mixture was then cooled, neutralised and concentrated by vacuum distillation to give a resin of solids content 65% having a viscosity of about 30 poise. The resin contained about 4.6 sulphite radicals per 100 methylene radicals.

Preparation of gelled resin particles.

To 100 parts of the concentrated resin solution were added 255 parts of a 3.33% phosphoric acid solution to give a solution having a resin solids content of about 18% and containing 13% $H_3PO_4$ based on the resin solids. The solution was poured into a casting mould wherein it gelled within about 9 minutes of the acid addition. The resin gelled in an extended form and was then broken into lumps which were dried overnight in an oven at 50° C. The dried resin was then cured by heating for 1 hour in an oven at 120° C. and then ground in water to a particle size below 100 $\mu$m. Micromeritic examination of the pigment showed that it had a surface are of 12 m$^2$/g and a pore volume of 1.5 cm$^3$/g. The particle density was 0.47 g/cm$^3$ and the true density was 1.56 g/cm$^3$. A similar powder was prepared in the same way from a UF resin having a formaldehyde: urea molar ratio of 2:1 but unmodified by inorganic oxyacid radicals. The two powders were used as pigments in paper handsheets using birch sulphate pulp as the papermaking furnish. Test of burst index, BI, which is the burst pressure in KNm$^{-2}$ divided by the substance in gm$^{-2}$, and bulk of the papers gave the following results.

| % particles in paper | particles with sulphite radicals | | particles with no sulphite radicals | |
|---|---|---|---|---|
| | BI KNg$^{-1}$ | Bulk cm$^3$ g$^{-1}$ | BI KNg$^{-1}$ | Bulk cm$^3$ g$^{-1}$ |
| 0 | 3.45 | 1.46 | 3.45 | 1.46 |
| 5 | 3.54 | 1.60 | 2.99 | 1.73 |
| 10 | 3.17 | 1.66 | 2.44 | 1.88 |

EXAMPLE 2

Pigment particles were prepared as in example 1 but diluting the concentrated sulphite containing resin solution to a solids content of 19% by addition of 160 parts of water followed by 90 parts of a 5% phosphoric acid solution. The amount of $H_3PO_4$ was thus about 7% of the resin solids. The time to gelation was 18 minutes.

EXAMPLE 3

Example 2 was repeated but the concentrated resin solution was diluted directly to the solids content of 19% by addition of 250 parts of the 5% phosphoric acid solution. The amount of $H_3PO_4$ was thus about 19%, based on the resin solids. The time to gelation was 5 minutes.

The cured, but unground, gelled resin masses produced in Examples 1 to 3 each had a density of about 0.28 g/cm$^3$.

EXAMPLE 4

50 parts of a concentrated sulphite modified resin solution produced as in Example 1 but having a solids content of 67% was mixed with 50 parts of a concentrated unmodified ureaformaldehyde resin having a formaldehyde:urea molar ratio of 2:1 and a solids content of 66%. The resultant mixture of resins was thus equivalent to a sulphite modified resin containing about 2.3 sulphite radicals per 100 methylene radicals. The mixture was diluted by addition of 200 parts of water followed by 200 parts of a 5% phosphoric acid solution to give a solution having a resin solids content of about 13% and containing about 15% $H_3PO_4$ based on the resin solids. This solution gelled in 10 minutes to give an extended mass which was dried and cured as in Example 1 to give a mass of cured density 0.14 g/cm$^3$.

EXAMPLE 5

Example 4 was repeated but diluting the mixed resin solution first with 800 parts of water followed by 100 parts of the 5% phosphoric acid solution. The final resin solids content was about 6.6% and, while the resin gelled, it took 51 minutes to do so and the gelled mass had a hard outer skin enclosing a soft damp core. Satisfactory pigment particles could not be obtained therefrom.

EXAMPLE 6

Example 1 was repeated save that the cured sulphite modified resin mass was ground dry to below 100 $\mu$m and then further ground in water on a ball mill for 40 minutes. A slurry of the pigment particles was made and added in varying amounts to mechanical pulp together with 2% aluminium sulphate. Paper was made from the resultant mixtures and the burst index and density of the papers so formed were measured. This procedure was repeated using as the concentrated resin
 (a) the mixture of the unmodified resin and the sulphite modified resin as used in Example 4,
 (b) the unmodified resin used in Example 4.

The results are shown in the table.

| Composition of paper | | mole % $SO_3''$ in resin particles (based on $-CH_2-$) | | | | | |
|---|---|---|---|---|---|---|---|
| | | 0 | | 2.3 | | 4.6 | |
| Particles % | Pulp % | BI KNg$^{-1}$ | density g cm$^{-3}$ | BI KNg$^{-1}$ | density g cm$^{-3}$ | BI KNg$^{-1}$ | density g cm$^{-3}$ |
| 0 | 100 | 0.78 | 0.402 | 0.78 | 0.402 | 0.78 | 0.402 |
| 5 | 95 | 0.75 | — | 0.78 | 0.409 | 0.87 | 0.414 |
| 10 | 90 | 0.70 | — | 0.71 | 0.389 | 0.77 | 0.400 |

Similar results were obtained when the resins were cured for 30 minutes at 120° C. instead of 1 hour.

EXAMPLE 7

A urea-formaldehyde resin modified by about 0.93 phosphate radicals per 100 methylene radicals was made as follows:

650 parts of formalin (36.4% formaldehyde, 5.7% methanol, acidity 0.016%) were mixed with 237 parts of urea (formaldehyde:urea molar ratio 2:1) and brought to pH 7 with caustic soda solution. 11.6 parts of sodium dihydrogen phosphate ($NaH_2PO_4.2H_2O$) were added and the mixture heated to 55° C., when further caustic soda was added to bring the pH to 6.05. The mixture was refluxed for 30 minutes, acidified to pH 4.9 with formic acid solution and refluxed further for 50 minutes. The pH was then adjusted to 5.4 with caustic soda solution, cooled to 40° C. and neutralised to pH 7 with more caustic soda solution. The resin was concentrated by heating under vacuum to remove 285 parts of distillate.

EXAMPLE 8

A urea-formaldehyde resin modified by about 0.93 phosphite radicals per 100 methylene radicals was made as follows:

650 parts of formalin and 237 parts of urea, as used in example 7, were mixed with 16 parts of disodium hydrogen phosphite ($Na_2HPO_3.5H_2O$) and refluxed for 30 minutes. Formic acid was added to reduce the pH to 4.85 and the mixture was further refluxed for 44 minutes. Caustic soda was then added to change the pH to 5.45, the resin was cooled to 50° C. and adjusted to pH 6.95. The resin was concentrated under vacuum, removing 355 parts of distillate.

EXAMPLE 9

A urea-formaldehyde resin modified by about 2.3 borate radicals per 100 methylene radicals was made as follows:

650 parts of formalin, and 237 parts of urea, as used in Example 7, were mixed and warmed to 40° C. 2.3 parts of boric acid ($H_3BO_3$) and 14.2 parts of borax ($Na_2B_4O_7.10H_2O$) were dissolved in the mixture which was then refluxed for 30 minutes at pH 8.05. Formic acid was added to bring the pH to 4.85 and the mixture refluxed for a further 43 minutes. Caustic soda was added to modify the pH to 5.6, the solution cooled to 50° C. and finally adjusted with caustic soda to pH 7. The resin was concentrated under vacuum to remove 345 parts of distillate.

Pigment powders of high surface area could be made by gelling the resins of Examples 7–9 in extended form by the method described in Example 1.

We claim:

1. A process for the manufacture of particles suitable for use as pigments in paper making which comprises;
 (A) reacting in an aqueous medium urea, formaldehyde and a source of inorganic oxyacid radicals selected from the group consisting of sulphite, phosphate, phosphite, and borate radicals, said source being present in such a quantity that ther are 0.2 to 15 moles, per 100 moles of formaldehyde, of said oxyacid radicals, to form an aqueous urea-formaldehyde resin solution;
 (B) adding an aqueous acid to said resin solution, the amount of said acid being sufficient to cause said resin to gel in an extended form of a mass of high area particles lightly bonded together;
 (C) drying the resultant gelled resin mass;

(D) curing said mass by heating at 100° C. to 200° C.; and (E) comminuting said cured gelled resin mass to powder form.

2. A process according to claim 1 in which the inorganic oxyacid radicals are sulphite radicals.

3. A process according to claim 1 in which the source of inorganic oxyacid radicals is present in such a quantity that there are 0.5 to 10 moles of said inorganic oxyacid radicals per 100 moles of formaldehyde.

4. A process according to claim 1 wherein the amount of aqueous acid added is sufficient to give an acidified resin solution having a resin solids content of less than 25% by weight.

5. A process according to claim 4 wherein the acidified resin solution has a resin solids content between 13 and 22% by weight.

6. A process according to claim 1 wherein the amount of acid added is sufficient to cause the resin to gel within 20 minutes.

7. A process according to claim 6 wherein the amount of acid, expressed as 100% acid, added is between 5 and 20% by weight of the resin solids.

8. A process according to claim 1 wherein the cured gelled resin mass is comminuted to a particle size below 200 μm.

9. A process according to claim 1 wherein the cured resin is comminuted by grinding in water.

* * * * *